(12) United States Patent
Jang et al.

(10) Patent No.: US 11,984,557 B2
(45) Date of Patent: May 14, 2024

(54) ELECTROLYTE SOLUTION FOR SECONDARY BATTERY, AND BATTERY AND FLEXIBLE BATTERY COMPRISING SAME

(71) Applicant: AMOGREENTECH CO., LTD., Gimpo-si (KR)

(72) Inventors: Ju Hee Jang, Uijeongbu-si (KR); Hyeon Woo Cho, Cheonan-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 876 days.

(21) Appl. No.: 16/965,624

(22) PCT Filed: Mar. 7, 2019

(86) PCT No.: PCT/KR2019/002648
§ 371 (c)(1),
(2) Date: Jul. 29, 2020

(87) PCT Pub. No.: WO2019/172674
PCT Pub. Date: Sep. 12, 2019

(65) Prior Publication Data
US 2021/0043977 A1 Feb. 11, 2021

(30) Foreign Application Priority Data
Mar. 8, 2018 (KR) .......................... 10-2018-0027389

(51) Int. Cl.
*H01M 10/0569* (2010.01)
*H01M 10/0567* (2010.01)
(Continued)

(52) U.S. Cl.
CPC ... *H01M 10/0569* (2013.01); *H01M 10/0567* (2013.01); *H01M 50/105* (2021.01);
(Continued)

(58) Field of Classification Search
CPC ......... H01M 10/0569; H01M 10/0567; H01M 2300/0028; H01M 2300/0037;
(Continued)

(56) References Cited

U.S. PATENT DOCUMENTS 9,196,928 B2  11/2015 Yun et al.
10,573,921 B2   2/2020 Kil et al.
(Continued)

FOREIGN PATENT DOCUMENTS

CN  102195085 A  9/2011
CN  105576291 A  5/2016
(Continued)

OTHER PUBLICATIONS

International Search Report cited in PCT/KR2019/002648 dated Jun. 25, 2019, 2 pages.
(Continued)

*Primary Examiner* — Jeremiah R Smith
(74) *Attorney, Agent, or Firm* — ROTHWELL, FIGG, ERNST & MANBECK, P.C.

(57) ABSTRACT

An electrolyte for a secondary battery is provided. The electrolyte for a secondary battery according to an embodiment of the present invention comprises: a non-aqueous organic solvent including propyl propionate (PP) and ethyl propionate (EP); a lithium salt; and an additive. The lithium salt is contained in a concentration of 0.6-1.6 M. Accordingly, when the electrolyte is applied to a battery and a flexible battery, excellent discharge performance can be exhibited in extremely low temperature and high temperature. In addition, the flexible battery of the present invention can prevent or minimize the deterioration of physical properties required as a battery even if repeated bending occurs. Such an electrolyte for a secondary battery of the present invention can be applied to various fields which require high (Continued)

discharge capacity at extremely low temperature and high temperature.

6 Claims, 3 Drawing Sheets

(51) Int. Cl.
    *H01M 50/105*     (2021.01)
    *H01M 50/136*     (2021.01)
    *H01M 50/178*     (2021.01)

(52) U.S. Cl.
    CPC ....... *H01M 50/136* (2021.01); *H01M 50/178* (2021.01); *H01M 2300/0028* (2013.01); *H01M 2300/0037* (2013.01); *H01M 2300/0042* (2013.01); *H01M 2300/0051* (2013.01)

(58) Field of Classification Search
    CPC ... H01M 2300/004; H01M 2300/0042; H01M 2300/0051; H01M 50/105; H01M 50/136; H01M 50/178
    See application file for complete search history.

(56) References Cited

U.S. PATENT DOCUMENTS

| | | | |
|---|---|---|---|
| 2014/0011081 A1 | 1/2014 | Ahn et al. | |
| 2014/0141342 A1 | 5/2014 | Lim et al. | |
| 2015/0340736 A1 | 11/2015 | Kim et al. | |
| 2016/0380307 A1* | 12/2016 | Akita | H01M 10/0525 429/144 |
| 2017/0117586 A1* | 4/2017 | Dubois | H01M 4/525 |
| 2017/0288257 A1* | 10/2017 | Kil | H01M 10/0566 |
| 2017/0288258 A1* | 10/2017 | Rho | H01M 10/058 |
| 2019/0280337 A1* | 9/2019 | Narita | H01G 11/52 |
| 2020/0168943 A1 | 5/2020 | Rho et al. | |

FOREIGN PATENT DOCUMENTS

| | | | | |
|---|---|---|---|---|
| CN | 105633463 | A | | 6/2016 |
| CN | 106058316 | A | * | 10/2016 |
| CN | 106605313 | A | | 4/2017 |
| CN | 106785034 | A | | 5/2017 |
| CN | 107508000 | A | | 12/2017 |
| CN | 109713367 | A | | 5/2019 |
| KR | 10-1335467 | B1 | | 11/2013 |
| KR | 10-2013-0142387 | A | | 12/2013 |
| KR | 20140116720 | A | | 10/2014 |
| KR | 10-1537142 | B1 | | 7/2015 |
| KR | 2015-0132037 | A | | 11/2015 |
| KR | 2016-0066518 | A | | 6/2016 |
| KR | 20170009873 | A | | 1/2017 |
| KR | 2017-0060944 | A | | 6/2017 |
| WO | WO-2016036157 | A1 | * | 3/2016 ............ H01M 10/04 |

OTHER PUBLICATIONS

Liu et al., "Effects of the LiPO2F2 additive on unwanted lithium plating in lithium-ion cells", Electrochimica Acta 263 (2018) pp. 237-248.

Office Action issued in corresponding KR Application No. 10-2018-0027389 dated Dec. 16, 2022 and English machine translation (18 pages).

Chinese Office Action for Chinese Patent Application No. 201980010609.8 dated Mar. 30, 2023. (10 pp.).

Chinese Office Action for Chinese Patent Application No. 201980010609.8 dated Nov. 18, 2023. (10 pp).

* cited by examiner

ELECTROLYTE SOLUTION FOR SECONDARY BATTERY, AND BATTERY AND FLEXIBLE BATTERY COMPRISING SAME

CROSS REFERENCE TO RELATED APPLICATIONS

This application is a 35 U.S.C. 371 National Phase Entry Application from PCT/KR2019/002648, filed Mar. 7, 2019, which claims the benefit of Korean Patent Application No. 10-2018-0027389 filed on Mar. 8, 2018 the disclosures of which are incorporated herein in their entirety by reference.

TECHNICAL FIELD

The present invention relates to an electrolyte solution for a secondary battery, and a battery and flexible battery including the same.

BACKGROUND

As consumer demands have changed due to digitization and high performance of electronic products, a market demand is also changing with development of power supplies which are thin and light in weight and have a high capacity due to high energy density.

In order to meet the needs of the consumers, power supplies such as a high energy density and high capacity lithium ion secondary battery, a lithium ion polymer battery, supercapacitors (an electric double layer capacitor and a pseudo capacitor), and the like are being developed.

Recently, demands for mobile electronic devices such as a mobile phone, a notebook, a digital camera, and the like are continuously increasing, and specifically, interest in a flexible mobile electronic device to which a scroll-type display, a flexible e-paper, a flexible liquid crystal display (a flexible LCD), a flexible organic light-emitting diode (a flexible OLED), or the like is applied has been increasing. Accordingly, a power supply for a flexible mobile electronic device should also be required to have flexible characteristics.

A flexible battery has been developed as one of power supplies capable of reflecting the above-described characteristics.

Examples of the flexible battery can be a nickel-cadmium battery, a nickel-metal hydride battery, a nickel-hydrogen battery, a lithium ion battery, or the like having flexible properties. Specifically, the lithium ion battery has high energy density per unit weight and can be rapidly charged in comparison with other batteries such as a lead acid battery, a nickel-cadmium battery, a nickel-hydrogen battery, a nickel-zinc battery, and the like, and thus has high utilization The lithium ion battery uses a liquid electrolyte, and is mainly used in the form of being welded using a metal can as a container. However, since the cylindrical lithium ion battery using a metal can as a container has a fixed shape, there is a disadvantage of limiting a design of an electrical product and it is difficult to reduce a volume.

Specifically, as mentioned above, since the mobile electronic devices are developed to be thinned and miniaturized as well as being flexible, there is a problem in that the conventional lithium ion battery using the metal can or a battery having a prismatic structure is not easy to apply to the above-described mobile electronic devices.

Accordingly, in order to solve the above-described structural problems, a pouch-type battery in which an electrolyte is put into a pouch including two electrodes and a separator and sealed to be used has been developed.

The pouch-type battery is made of a material having flexibility and can be manufactured in various forms and has an advantage of realizing high energy density per mass.

However, an electrolyte solution provided in the battery which is commercially available or developed until now guarantees discharge performance up to $-20°$ C., but at $-32°$ C., there is a problem in that discharge performance is significantly decreased.

SUMMARY OF THE INVENTION

The present invention is directed to providing an electrolyte solution for a secondary battery capable of exhibiting excellent discharge performance even in extremely low and high temperatures when applied to a battery and a flexible battery.

Further, the present invention is directed to providing a flexible battery capable of preventing or minimizing degradation of a physical property required as a battery even when repetitive bending occurs.

One aspect of the present invention provides an electrolyte solution for a secondary battery including a non-aqueous organic solvent including propyl propionate (PP) and ethyl propionate (EP), a lithium salt, and an additive, wherein the lithium salt is included in a concentration of 0.6 to 1.6 M.

According to one embodiment of the present invention, the propyl propionate and the ethyl propionate may be included in an amount of 60 to 90% by volume based on a total volume of the non-aqueous organic solvent.

Further, the non-aqueous organic solvent may include the propyl propionate and the ethyl propionate in a volume ratio of 1:0.2 to 0.8.

In addition, the non-aqueous organic solvent may further include one or more selected from the group consisting of ethylene carbonate (EC) and propylene carbonate (PC).

In addition, the non-aqueous organic solvent may include 20 to 80 parts by volume of ethyl propionate, 15 to 65 parts by volume of ethylene carbonate, and 3 to 17 parts by volume of propylene carbonate based on 100 parts by volume of propyl propionate.

In addition, the additive may include one or more selected from the group consisting of vinylene carbonate (VC), 1,3-propane sultone (PS), fluoroethylene carbonate (FEC), ethylene sulfate (ESA), LiBOB, $LiPO_2F_2$, and adiponitrile (ADN) in an amount of 1 to 8% by weight based on a total weight of the electrolyte solution for a secondary battery.

In addition, the additive may include vinylene carbonate (VC) in an amount of 0.1 to 1% by weight, 1,3-propane sultone (PS) in an amount of 0.8 to 3.2% by weight, fluoroethylene carbonate (FEC) in an amount of 1.2 to 3.8% by weight, and adiponitrile (ADN) in an amount of 0.1 to 1% by weight based on a total weight of the electrolyte solution for a secondary battery.

In addition, the additive may include ethylene sulfate (ESA) in an amount of 0.1 to 1% by weight, fluoroethylene carbonate (FEC) in an amount of 1.2 to 3.8% by weight, and LiBOB in an amount of 0.1 to 1% by weight based on a total weight of the electrolyte solution for a secondary battery.

In addition, the additive may include ethylene sulfate (ESA) in an amount of 0.1 to 1% by weight, fluoroethylene carbonate (FEC) in an amount of 1.2 to 3.8% by weight, and $LiPO_2F_2$ in an amount of 0.1 to 1% by weight based on a total weight of the electrolyte solution for a secondary battery.

Meanwhile, another aspect of the present invention provides a flexible battery including an electrode assembly, the above-described electrolyte solution, and an exterior material configured to encapsulate the electrode assembly with the electrolyte solution.

According to one embodiment of the present invention, a discharge capacity measured by the following measuring method may be 80% or more:

[Measuring Method]

A flexible battery is charged at 25° C. and stored at −32° C. for 24 hours, and then the discharge capacity is measured.

Meanwhile, according to still another aspect of the present invention, the present invention provides a battery for a secondary battery including the above-described electrolyte solution.

Advantageous Effects

In an electrolyte solution for a secondary battery according to the present invention, there is an effect in that the electrolyte solution for a secondary battery can exhibit excellent discharge performance even in extremely low and high temperatures when applied to a battery and a flexible battery.

Further, the flexible battery of the present invention can prevent or minimize degradation of a physical property required as a battery even when repetitive bending occurs.

The above-described electrolyte solution for a secondary battery of the present invention can be applied to various fields which require securing of a high discharge capacity even in extremely low and high temperatures.

BEST MODE

Hereinafter, the present invention will be described in more detail.

An electrolyte solution for a secondary battery according to one embodiment of the present invention includes a non-aqueous organic solvent, a lithium salt, and an additive.

First, the non-aqueous organic solvent will be described.

The non-aqueous organic solvent includes propyl propionate (PP) and ethyl propionate (EP).

The propyl propionate and the ethyl propionate may be included in an amount of 60 to 90% by volume, and preferably 65 to 85% by volume based on the total volume of the non-aqueous organic solvent. When the propyl propionate and the ethyl propionate are smaller than 60% by volume or greater than 90% by volume based on the total volume of the non-aqueous organic solvent, the discharge capacity may be decreased in extremely low and high temperatures.

Further, the non-aqueous organic solvent may include the propyl propionate and the ethyl propionate at a volume ratio of 1:0.2 to 0.8, and preferably, a volume ratio of 1:0.3 to 0.7. When the volume ratio of the propyl propionate and the ethyl propionate is smaller than 1:0.2 or greater than 1:0.8, the discharge capacity may be decreased in the extremely low and high temperatures.

Further, in order to satisfy the volume ratio of the propyl propionate and the ethyl propionate, the non-aqueous organic solvent may include 20 to 80 parts by volume of ethyl propionate, and preferably, 35 to 65 parts by volume of ethyl propionate based on 100 parts by volume of propyl propionate. When the ethyl propionate is smaller than 20 parts by volume or greater than 80 parts by volume based on 100 parts by volume of propyl propionate, the discharge capacity may be decreased in the extremely low and high temperatures.

Meanwhile, a non-aqueous organic solvent which is commonly used in the art other than the propyl propionate and the ethyl propionate may be used as the non-aqueous organic solvent without limitation, and preferably, the non-aqueous organic solvent may further include one or more selected from the group consisting of a propionate-based non-aqueous organic solvent and a carbonate-based non-aqueous organic solvent. More preferably, the non-aqueous organic solvent may further include a carbonate-based non-aqueous organic solvent and may be more advantageous in dissociating the lithium salt and improving a low temperature property by further including one or more selected from the group consisting of ethylene carbonate and propylene carbonate.

When the non-aqueous organic solvent further include the ethylene carbonate and the propylene carbonate, the non-aqueous organic solvent may include 15 to 65 parts by volume of ethylene carbonate and 3 to 17 parts by volume of propylene carbonate, and preferably, 20 to 60 parts by volume of ethylene carbonate and 5 to 15 parts by volume of propylene carbonate based on 100 parts by volume of propyl propionate. When a content of the ethylene carbonate departs from the above-described range, a resistance may increase, and when a content of the propylene carbonate departs from the above-described range, a lifespan may be decreased Further, the lithium salt will be described.

A lithium salt which is commonly used in the art may be used as the lithium salt without limitation, and preferably, using $LiPF_6$ may be more excellent in improving the discharge capacity in the extremely low and high temperatures.

Further, the lithium salt may be included in the electrolyte solution for a secondary battery of the present invention in a concentration of 0.6 to 1.6 M, and preferably, in a concentration of 0.8 to 1.4 M. When the lithium salt is included in the electrolyte solution for a secondary battery of the present invention in a concentration smaller than 0.8 M, lithium ions may be insufficient, and when the lithium salt is included in the electrolyte solution for a secondary battery of the present invention in a concentration greater than 1.4 M, a decrease in ion conductivity may occur due to an increase in electrolyte solution viscosity, and the temperature characteristic may decrease.

Further, the additive will be described.

The additive functions to improve the discharge capacity in the extremely low and high temperatures.

An additive which is commonly used in the art may be used as the additive without limitation, and preferably, the additive may include one or more selected from the group consisting of vinylene carbonate (VC), 1,3-propane sultone (PS), fluoroethylene carbonate (FEC), ethylene sulfate (ESA), LiBOB, $LiPO_2F_2$, and adiponitrile (ADN).

Further, the additive may be included in an amount of 1 to 8% by weight, and preferably 2 to 7% by weight based on the total weight of the electrolyte solution for a secondary battery. When the additive is smaller than 1% by weight or greater than 8% by weight based on the total weight of the electrolyte solution for a secondary battery, the discharge capacity in the extremely low and/or high temperatures may be decreased.

Meanwhile, according to one embodiment of the present invention, the additive may include vinylene carbonate (VC), 1,3-propane sultone (PS), fluoroethylene carbonate (FEC), and adiponitrile (ADN).

In this case, the additive may include vinylene carbonate (VC) in an amount of 0.1 to 1% by weight, 1,3-propane sultone (PS) in an amount of 0.8 to 3.2% by weight, fluoroethylene carbonate (FEC) in an amount of 1.2 to 3.8% by weight, and adiponitrile (ADN) in an amount of 0.1 to 1% by weight, and preferably, vinylene carbonate (VC) in an amount of 0.3 to 0.8% by weight, 1,3-propane sultone (PS) in an amount of 1.2 to 2.8% by weight, fluoroethylene carbonate (FEC) in an amount of 1.5 to 3.5% by weight, and adiponitrile (ADN) in an amount of 0.3 to 0.8% by weight based on the total weight of the electrolyte solution for a secondary battery. Accordingly, the discharge capacity in the extremely low and/or high temperatures may be remarkably excellent.

Further, according to another embodiment of the present invention, the additive may include ethylene sulfate (ESA), fluoroethylene carbonate (FEC), and LiBOB.

In this case, the additive may include ethylene sulfate (ESA) in an amount of 0.1 to 1% by weight, fluoroethylene carbonate (FEC) in an amount of 1.2 to 3.8% by weight, and LiBOB in an amount of 0.1 to 1% by weight, and preferably, ethylene sulfate (ESA) in an amount of 0.3 to 0.8% by weight, fluoroethylene carbonate (FEC) in an amount of 1.5 to 3.5% by weight, and LiBOB in an amount of 0.3 to 0.8% by weight based on the total weight of the electrolyte solution for a secondary battery. Accordingly, the discharge capacity in the extremely low and/or high temperatures may be remarkably excellent.

Further, according to still another embodiment of the present invention, the additive may include ethylene sulfate (ESA), fluoroethylene carbonate (FEC), and $LiPO_2F_2$.

In this case, the additive may include ethylene sulfate (ESA) in an amount of 0.1 to 1% by weight, fluoroethylene carbonate (FEC) in an amount of 1.2 to 3.8% by weight, and $LiPO_2F_2$ in an amount of 0.1 to 1% by weight, and preferably, ethylene sulfate (ESA) in an amount of 0.3 to 0.8% by weight, fluoroethylene carbonate (FEC) in an amount of 1.5 to 3.5% by weight, and $LiPO_2F_2$ in an amount of 0.3 to 0.8% by weight based on the total weight of the electrolyte solution for a secondary battery. Accordingly, the discharge capacity in the extremely low and/or high temperatures may be remarkably excellent.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

Figure 1:
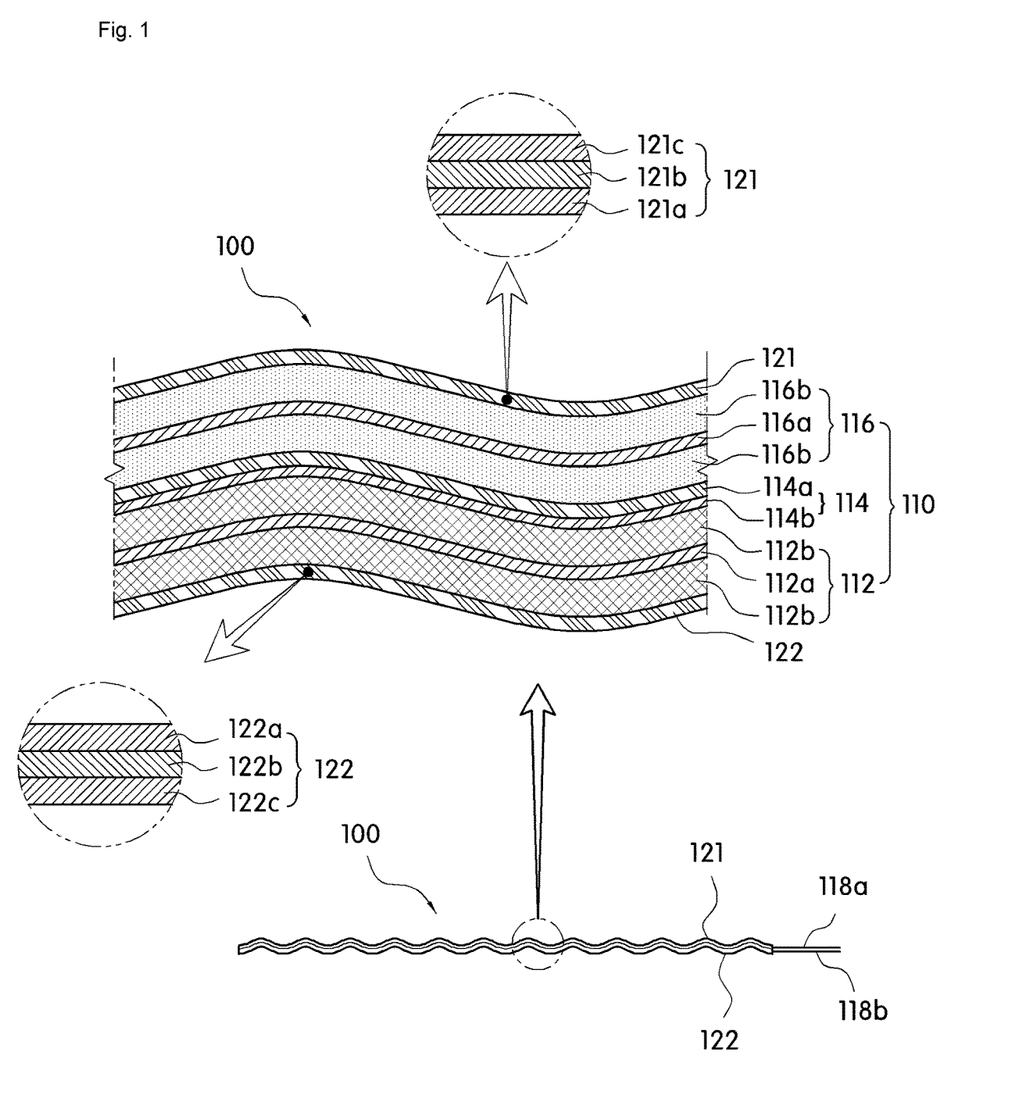
FIG. 1 is an enlarged view illustrating detailed configurations of a flexible battery according to one embodiment of the present invention.

As shown in FIG. 1, a flexible battery 100 according to one embodiment of the present invention includes an electrode assembly 110, the above-described electrolyte solution according to the present invention, and an exterior material 120 which encapsulate the electrode assembly 110 with the electrolyte solution.

First, the electrode assembly 110 will be described.

The electrode assembly 110 is encapsulated with the electrolyte solution in the exterior material 120 which will be described later, and as shown in FIG. 1, includes a positive electrode 112, a negative electrode 116, and a separator 114.

The positive electrode 112 may include a positive electrode current collector 112a and a positive electrode active material 112b, the negative electrode 116 may include a negative electrode current collector 116a and a negative electrode active material 116b, and each of the positive electrode current collector 112a and the negative electrode current collector 116a may be implemented in a plate-type sheet shape having a predetermined area.

That is, in the positive electrode 112 and the negative electrode 116, the active materials 112b and 116b may be compressed, deposited, or coated on one surface or both surfaces of each of the current collectors 112a and 116a. In this case, at least one surface of each of the current collectors 112a and 116a may be partially or entirely provided with the active materials 112b and 116b.

Here, a material which is commonly used as a positive electrode current collector of a flexible battery in the art may be used as the positive electrode current collector 112a without limitation, and preferably, aluminum (Al) may be used.

Further, the positive electrode current collector 112a may have a final thickness of 10 to 30 μm, and preferably, may have a thickness of 15 to 25 μm.

Further, a material which is commonly used as a negative electrode current collector of a flexible battery in the art may be used as the negative electrode current collector 116a without limitation, and preferably, copper (Cu) may be used.

In addition, the negative electrode current collector 116a may have a final thickness of 3 to 18 μm, and preferably, may have a thickness of 6 to 15 μm.

Figure 2:
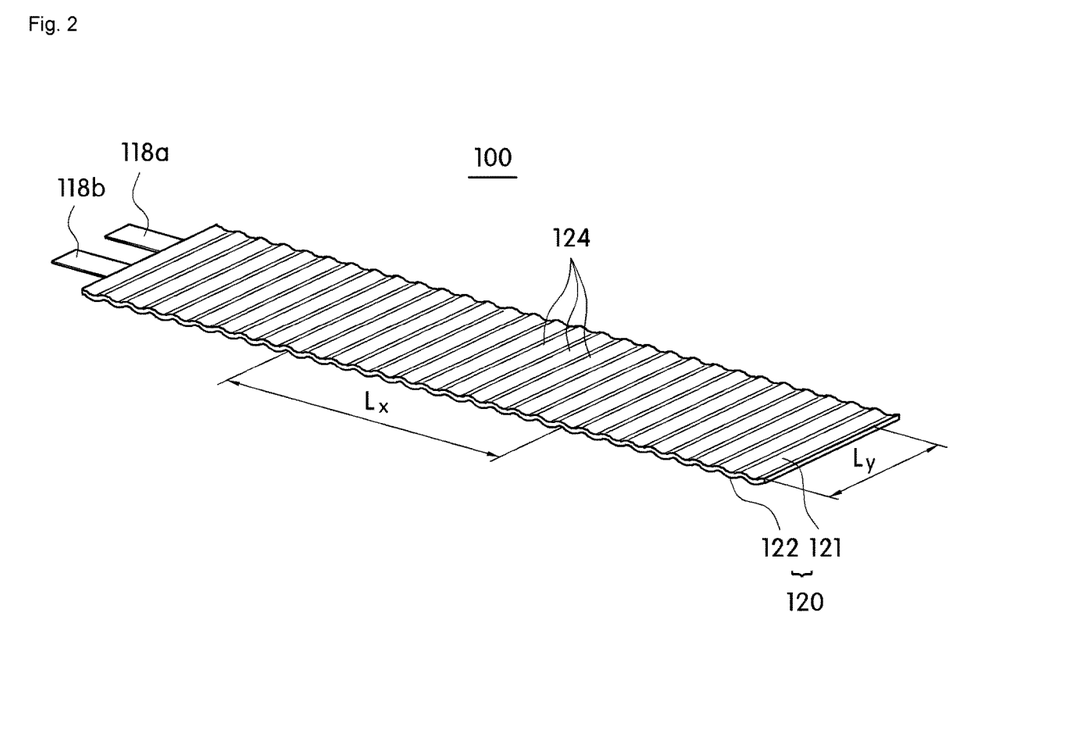
FIG. 2 is an overall schematic view illustrating the flexible battery according to one embodiment of the present invention.
Figure 3:
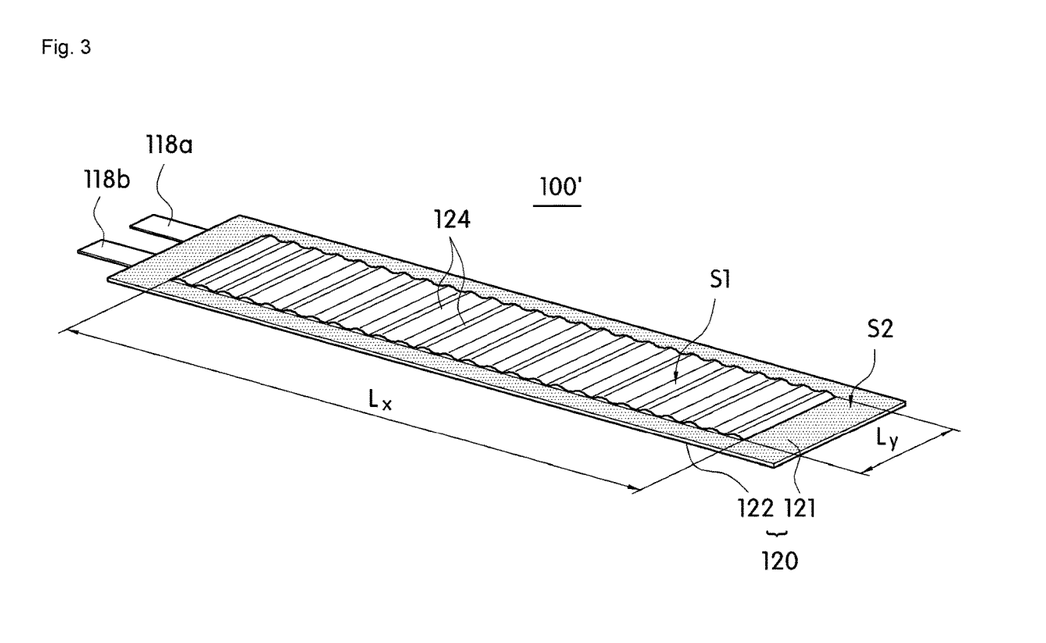
FIG. 3 is an overall schematic view illustrating a flexible battery according to another embodiment of the present invention.

Further, as shown in FIGS. 1 to 3, the positive electrode current collector 112a and the negative electrode current collector 116a may be respectively formed with a negative electrode terminal 118a and a positive electrode terminal 118b for electrical connection between bodies thereof and external devices. Here, the positive electrode terminal 118b and the negative electrode terminal 118a may be provided in shapes which respectively extends from the positive electrode current collector 112a and the negative electrode current collector 116a to protrude toward one side of the exterior material 120, and may be provided to be exposed to a surface of the exterior material 120.

Meanwhile, the positive electrode active material 112b includes a positive electrode active material capable of reversibly intercalating and deintercalating lithium ions, and representative examples of the positive electrode active material may be one of a Li-transition metal oxide such as $LiCoO_2$, $LiNiO_2$, $LiNiCoO_2$, $LiMnO_2$, $LiMn_2O_4$, $V_2O_5$, $V_6O_{13}$, $LiNi_{1-x-y}Co_xM_yO_2$ ($0 \leq x \leq 1$, $0 \leq y \leq 1$, $0 \leq x+y \leq 1$, M is a metal such as Al, Sr, Mg, La, or the like), and a lithium nickel cobalt manganese (NCM)-based active material, and a mixture of one or more thereof may be used.

Further, the negative electrode active material 116b includes a negative electrode active material capable of reversibly intercalating and deintercalating lithium ions, and the negative electrode active material may be selected from the group consisting of crystalline or amorphous carbon, a carbon fiber, or carbon-based negative electrode active material of a carbon composite, tin oxide, a lithiated material thereof, lithium, a lithium alloy, and a mixture of one or more thereof. Here, the carbon may be at least one selected from the group consisting of a carbon nanotube, a carbon nanowire, a carbon nanofiber, black lead, activated carbon, graphene, and graphite.

However, the positive electrode active material and the negative electrode active material used in the present invention are not limited thereto, and all of the positive electrode active material and the negative electrode active material which are commonly used may be used.

In this case, in the present invention, the positive electrode active material 112b and the negative electrode active material 116b may contain polytetrafluoroethylene (PTFE) components so that the positive electrode active material 112b and the negative electrode active material 116b may be prevented from peeling from the current collectors 112a and 116a or cracks during the bending.

The above-described PTFE component may be 0.5 to 20% by weight of the total weight of each of the positive electrode active material 112b and the negative electrode active material 116b, and preferably, 5% by weight or less of the total weight.

Meanwhile, the separator 114 disposed between the positive electrode 112 and the negative electrode 116 may include a nanofiber web layer 114b on one surface or both surfaces of a nonwoven fabric layer 114a.

Here, the nanofiber web layer 114b may be a nanofiber containing at least one selected from a polyacrylonitrile nanofiber and a polyvinylidene fluoride nanofiber.

Preferably, the nanofiber web layer 114b may be composed of only a polyacrylonitrile nanofiber to secure spinnability and form uniform pores. Here, the polyacrylonitrile nanofiber may have an average diameter of 0.1 to 2 μm, and preferably, may have an average diameter of 0.1 to 1.0 μm.

This is because, when the average diameter of the polyacrylonitrile nanofiber is smaller than 0.1 μm, there may be a problem in that the separator does not secure sufficient heat resistance, and when the average diameter of the polyacrylonitrile nanofiber is greater than 2 μm, the separator may have excellent mechanical strength, but may have a reduced elastic force.

Further, in the separator 114, when a gel polymer electrolyte solution is used as the electrolyte solution, a composite porous separator nay be used to optimize an impregnation property of the gel polymer electrolyte solution.

That is, the composite porous separator is used as a matrix and may include a porous nonwoven fabric having fine pores and a porous nanofiber web which is formed of a spinning polymer material and impregnates the electrolyte solution.

Here, the porous nonwoven fabric may include one of a polypropylene (PP) nonwoven fabric, a polyethylene (PE) nonwoven fabric, a nonwoven fabric composed of a double structured PP/PE fiber coated with PE on an outer periphery of the PP fiber as a core, a nonwoven fabric having a three layer structure of PP/PE/PP and having a shutdown function by PE with a relatively low melting point, a polyethylene terephthalate (PET) nonwoven fabric made of a polyethylene terephthalate (PET) fiber, and a nonwoven fabric made of a cellulose fiber. Further, the PE nonwoven fabric may have a melting point of 100° C. to 120° C., the PP nonwoven fabric may have a melting point of 130° C. to 150° C., and the PET nonwoven fabric may have a melting point of 230° C. to 250° C.

In this case, the porous nonwoven fabric may be set to have a thickness in a range of 10 to 40 μm, a porosity of 5 to 55%, and a Gurley value of 1 to 1000 sec/100 c.

Meanwhile, a swellable polymer which is swelled in the electrolyte solution, or a mixed polymer in which a heat-resistant polymer capable of enhancing heat resistance is mixed with the swellable polymer may be used as the porous nanofiber web.

In the above-described porous nanofibrous web, when a single or mixed polymer is dissolved in a solvent to form a spinning solution, and then the spinning solution is spun using an electrospinning device, a spun nanofiber is accumulated in a collector and a porous nanofibrous web having a three-dimensional pore structure is formed.

Here, all polymers dissolved in a solvent to form a spinning solution and then spun by an electrospinning method to form a nanofiber may be used as the porous nanofiber web. For example, the polymer may be a single polymer or a mixed polymer, and a swellable polymer, a non-swellable polymer, a heat-resistant polymer, a mixed polymer in which a swellable polymer and a non-swellable polymer are mixed, a mixed polymer in which a swellable polymer and a heat-resistant polymer are mixed, or the like may be used as the polymer.

In this case, when the mixed polymer of the swellable polymer and the non-swellable polymer (or the heat-resistant polymer) is used as the porous nanofiber web, the swellable polymer and the non-swellable polymer may be mixed with a weight ratio in a range of 9:1 to 1:9, and preferably, a weight ratio in a range of 8:2 to 5:5.

Commonly, the non-swellable polymer is generally the heat-resistant polymer and has a greater molecular weight in comparison with the swellable polymer and thus has a relatively higher melting point. Accordingly, the non-swellable polymer may be a heat-resistant polymer having a melting point of 180° C. or more, and the swellable polymer may be a resin having a melting point of 150° C. less, and preferably, may be a resin having a melting point in a range of 100 to 150° C.

Meanwhile, as the swellable polymer that can be used in the present invention, a polymer which is a resin which is swellable in the electrolyte solution and is capable of forming ultra-fine nanofibers by electrospinning may be used.

For example, polyvinylidene fluoride (PVDF), poly(vinylidene fluoride-co-hexafluoropropylene), perfluoropolymer, polyvinyl chloride or polyvinylidene chloride and copolymers thereof, polyethylene glycol derivatives including polyethylene glycol dialkyl ether and polyethylene glycol dialkyl ester, poly(oxymethylene-oligo-oxyethylene), polyoxide including polyethylene oxide and polypropylene oxide, polyvinyl acetate, poly(vinylpyrrolidone-vinyl acetate), polystyrene and polystyrene acrylonitrile copolymers, polyacrylonitrile copolymers including polyacrylonitrile methyl methacrylate copolymers, polymethyl methacrylate, polymethyl methacrylate copolymers, and a mixture of one or more thereof may be used as the swellable polymer.

Further, the heat-resistant polymer or non-swellable polymer may be dissolved in an organic solvent for electrospinning, and swelling occurs slowly or does not occur in comparison with the swellable polymer due to the organic solvent included in an organic electrolyte solution, and a resin having a melting point of 180° C. or more may be used.

For example, polyacrylonitrile (PAN), polyamide, polyimide, polyamideimide, poly(meth-phenylene isophthalamide), polysulfone, polyether ketone, polyethylene terephthalate, polytrimethylene telephthalate, aromatic polyester such as polyethylene naphthalate or the like, polytetrafluoroethylene, polydiphenoxyphosphazene, polyphosphazene such as poly {bis[2-(2-methoxyethoxy)phosphagen]}, polyurethane copolymers including polyurethane and polyether urethane, cellulose acetate, cellulose acetate butylate, cellulose acetate propionate, and the like may be used as the heat-resistant polymer or non-swellable polymer.

Meanwhile, one or more selected from among cellulose, cellulose acetate, polyvinyl alcohol (PVA), polysulfone, polyimide, polyetherimide, polyamide, polyethylene oxide (PEO), polyethylene (PE), polypropylene (PP), polyethylene terephthalate (PET), polyurethane (PU), polymethyl methacrylate (PMMA), and polyacrylonitrile may be used as a nonwoven fabric constituting the nonwoven fabric layer 114a.

Here, the nonwoven fabric layer may further include an inorganic additive, and the inorganic additive may include one or more selected among SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, and PTFE.

Further, an inorganic particle which is the inorganic additive may have an average particle diameter of 10 to 50 nm, preferably, may have an average particle diameter of 10 to 30 nm, and more preferably, may have an average particle diameter of 10 to 20 nm.

Further, an average thickness of the separator may be 10 to 100 µm, and preferably, may be 10 to 50 µm. This is because the separator is too thin and thus may not secure long-term durability due to repeated bending and/or spreading of the battery when the average thickness of the separator is smaller than 10 µm, and there is a disadvantage for thinning the flexible battery when the average thickness of the separator is greater than 100 µm, and thus the separator may have an average thickness within the above-described range.

Further, the nonwoven fabric layer may have an average thickness of 10 to 30 µm, and preferably, may have an average thickness of 15 to 30 µm, and the nanofiber web layer may have an average thickness of 1 to 5 µm.

The exterior material 120 is formed of a plate-shaped member having a predetermined area and is provided to protect the electrode assembly 110 from an external force by accommodating the electrode assembly 110 and the electrolyte solution therein.

To this end, as shown in FIGS. 2 and 3, the exterior material 120 is provided as a pair of a first exterior material 121 and a second exterior material 122 and is sealed along an edge by an adhesive to prevent exposure and leakage of the electrolyte solution and the electrode assembly 110 which is accommodated therein to the outside.

That is, the first exterior material 121 and the second exterior material 122 include the first region S1 forming an accommodation part which accommodates the electrode assembly and the electrolyte solution, and a second region S2 disposed to surround the first region S1 and forming a sealing part which blocks leakage of the electrolyte solution to the outside.

In the exterior material 120, edge portions constituting the sealing part may be sealed through an adhesive after the first exterior material 121 and the second exterior material 122 are formed as two members, or the remaining portions which meet with each other may be sealed through an adhesive after the first exterior material 121 and the second exterior material 122 are formed as one member and folded in half along a width direction or a longitudinal direction.

Further, the exterior material 120 may include a pattern 124 for contraction and relaxation in a longitudinal direction during bending, and as shown in FIG. 2, both the first region S1 and the second region S2 may be formed with the pattern, and preferably, as shown in FIG. 3, the pattern 124 may be formed in only the first region S1.

Meanwhile, for the pattern according to the present invention, Korean Registered Patent No. 10-1680592 of the inventor of the present invention may be inserted as a reference to the present invention, and thus the detailed description of the pattern will be omitted.

Further, when the exterior material 120 does not include a pattern, the exterior material 120 may use a polymer film having excellent water resistance, and in this case, a separate pattern may not be provided due to flexible characteristics of the polymer film.

The exterior material 120 may be provided in a shape in which metal layers 121b and 122b are provided between first resin layers 121a and 122a and second resin layers 121c and 122c. That is, the exterior material 120 is composed in a shape in which the first resin layers 121a and 122a, the metal layers 121b and 122b, and the second resin layers 121c and 122c are sequentially laminated, the first resin layers 121a and 122a are disposed at an inner side to come into contact with the electrolyte solution, and the second resin layers 121c and 122c are exposed to the outside.

In this case, the first resin layers 121a and 122a serve as a bonding member which seals between the exterior materials 121 and 122 to seal the electrolyte solution provided in the battery so that the electrolyte solution does not leak to the outside. The first resin layers 121a and 122a may be a material of a bonding member commonly provided in an exterior material for a battery, but preferably, may include a single layer structure of one of acid modified polypropylene (PPa), casting polypropylene (CPP), linear low density polyethylene (LLDPE), low density polyethylene (LDPE), high density polyethylene (HDPE), polyethylene, polyethylene terephthalate, polypropylene, ethylene vinyl acetate (EVA), an epoxy resin, and a phenolic resin, or a laminated structure thereof, and more preferably, may be composed of a single layer selected from acid modified polypropylene (PPa), casting polypropylene (CPP), linear low density polyethylene (LLDPE), low density polyethylene (LDPE), and high density polyethylene (HDPE) or may be composed of a laminated structure of two or more thereof.

Further, each of the first resin layers 121a and 122a may have an average thickness of 20 µm to 100 µm, and preferably, may have an average thickness of 20 µm to 80 µm.

This is because, when the average thickness of each of the first resin layers 121a and 122a is smaller than 20 µm, bonding strength between the first resin layers 121a and 122a which meet with each other may degrade in a process of sealing edge sides of the first exterior material 121 and the second exterior material 122 or it may be disadvantageous to secure airtightness to prevent leakage of the electrolyte solution, and when the average thickness is greater than 100 µm, it is uneconomical and disadvantageous for thinning.

The metal layers 121b and 122b are interposed between the first resin layers 121a and 122a and the second resin layers 121c and 122c to prevent penetration of moisture into the accommodation part from the outside and prevent leakage of the electrolyte solution from the accommodation part to the outside.

To this end, the metal layers 121b and 122b may be formed as dense metal layers so that the moisture and the electrolyte may not pass therethrough. The metal layer is formed through a foil-type metal thin film or a metal deposition film formed on the second resin layers 121c and 122c, which will be described later, through methods known in the art, for example, sputtering, chemical vapor deposition, and the like, and preferably, may be formed of a thin metal plate. Accordingly, since crack of the metal layer is prevented when a pattern is formed, leakage of the electrolyte solution to the outside and moisture permeation from the outside may be prevented.

For example, the metal layers 121b and 122b may include one or more selected from aluminum, copper, phosphor bronze (PB), aluminum bronze, white copper, beryllium-copper, chromium-copper, titanium-copper, iron-copper, a corson alloy, and a chromium-zirconium copper alloy.

In this case, the metal layers 121b and 122b may have a linear expansion coefficient of $1.0 \times 10^{-7}$ to $1.7 \times 10^{-7}$/° C., and preferably, a linear expansion coefficient of $1.2 \times 10^{-7}$ to $1.5 \times 10^{-7}$/° C. This is because, when the linear expansion coefficient is smaller than $1.0 \times 10^{-7}$/° C., sufficient flexibility may not be secured, and thus crack may occur due to an external force generated during bending, and when the linear expansion coefficient is greater than $1.7 \times 10^{-7}$/° C., rigidity is lowered, and thus deformation may occur severely.

Each of the above-described metal layers 121b and 122b may have an average thickness of 5 μm or more, preferably, an average thickness of 5 μm to 100 μm, and more preferably, an average thickness of 30 μm to 50 μm.

This is because, when the average thickness of the metal layer is smaller than 5 μm, moisture may penetrate into the accommodation part or the electrolyte solution in the accommodation part may leak to the outside.

The second resin layers 121c and 122c are located on an exposed surface side of the exterior material 120 to reinforce strength of the exterior material and prevent damage such as scratches to the exterior material by physical contact applied from the outside.

The above-described second resin layers 121c and 122c may include one or more selected from nylon, polyethylene terephthalate (PET), cyclo olefin polymer (COP), polyimide (PI) and a fluorine-based compound, and preferably, may include nylon or a fluorine-based compound.

Here, the fluorine-based compound may include one or more selected from polytetrafluoroethylene (PTFE), perfluorinated acid (PFA), a fluorinated ethylene propylene copolymer (FEP), polyethylene tetrafluoroethylene (ETFE), polyvinylidene fluoride (PVDF), ethylene chlorotrifluoroethylene (ECTFE), and polychlorotrifluoroethylene (PCTFE).

In this case, each of the second resin layers 121c and 122c may have an average thickness of 10 μm to 50 μm, preferably, an average thickness of 15 μm to 40 μm, and more preferably, an average thickness of 15 μm to 35 μm.

This is because, when the average thickness of each of the second resin layers 121c and 122c is smaller than 10 μm, a mechanical property may not be secured, and when the average thickness is greater than 50 μm, there is an advantage for securing the mechanical property, but it is uneconomical and disadvantageous for thinning.

Meanwhile, each of the flexible batteries 100 and 100' according to the present invention may further include adhesion layers between the metal layers 121b and 122b and the first resin layers 121a and 122a.

The adhesive layers may serve to increase adhesion between the metal layers 121b and 122b and the first resin layers 121a and 122a and may prevent the electrolyte solution accommodated in the exterior material from reaching the metal layers 121b and 122b of the exterior material to prevent corrosion of the metal layers 121b and 122b by an acid electrolyte solution and/or peeling of the first resin layers 121a and 122a and the metal layers 121b and 122b. Further, even when problems such as abnormal overheating and the like occur, and thus the flexible battery expands during a process of using the flexible batteries 100 and 100', leakage of the electrolyte solution may be prevented, and thus reliability for safety may be granted.

The above-described adhesive layers may be formed of a material similar to a material forming the first resin layers 121a and 122a to improve adhesion according to compatibility with the first resin layers 121a and 122a. For example, the adhesive layers may include at least one selected from silicone, polyphthalate, acid modified polypropylene (PPa), and acid modified polyethylene (Pea).

In this case, each of the adhesion layers may have an average thickness of 5 μm to 30 μm, and preferably, an average thickness of 10 μm to 20 μm. This is because, when the average thickness of the adhesion layer is smaller than 5 μm, stable adhesion may be difficult to secure, and when the average thickness of the adhesion layer is greater than 30 μm, it is disadvantageous for thinning.

Further, each of the flexible batteries 100 and 100' according to the present invention may further include a dry laminate layer between the metal layers 121b and 122b and the second resin layers 121c and 122c.

The dry laminate layer serves to bond the metal layers 121b and 122b and the second resin layers 121c and 122c, and may be formed by drying a known aqueous and/or oily organic solvent-based adhesive.

In this case, the dry laminate layer may have an average thickness of 1 μm to 7 μm, preferably, 2 μm to 5 μm, and more preferably, 2.5 μm to 3.5 μm.

This is because, when the average thickness of the dry laminate layer is smaller than 1 μm, adhesion is too weak and thus peeling between the metal layers 121b and 122b and the second resin layers 121c and 122c may occur, and when the average thickness of the dry laminate layer is greater than 7 μm, the thickness of the dry laminate layer is unnecessarily thick, which may adversely affect formation of a pattern for contraction and relaxation.

Meanwhile, in the flexible battery according to the present invention, a discharge capacity measured by the following measuring method may be 80% or more, and preferably, may be 85% or more.

[Measuring Method]

The flexible battery is charged at 25° C. and stored at −32° C. for 24 hours, and then the discharge capacity is measured.

The discharge capacity shows the performance of a battery, a case in which the discharge capacity is high shows that the performance of the battery is excellent even in the extremely low temperature, and a case in which the discharge capacity is low shows that the performance of the battery is poor in the extremely low temperature Further, the battery for a secondary battery according to one embodiment of the present invention includes the above-described electrolyte solution according to the present invention.

A description of the battery for a secondary battery is the same as that of a battery for a secondary battery which is commonly used in the art, and will be omitted in the specification.

Meanwhile, in the electrolyte solution for a secondary battery of the present invention, there is an effect in that the electrolyte solution for a secondary battery may exhibit excellent discharge performance even in extremely low and high temperatures when applied to a battery and a flexible battery. Further, the flexible battery of the present invention may prevent or minimize degradation of a physical property required as a battery even when repetitive bending occurs. The above-described electrolyte solution for a secondary battery of the present invention may be applied to various fields which require securing of a high discharge capacity even in extremely low and high temperatures.

[Modes of the Invention]

The present invention will be more specifically described through the following examples, but the following examples do not limit the scope of the present invention and should be interpreted as aiding in understanding of the present invention.

Example 1

First, a metal layer formed of an aluminum material having a thickness of 30 μm was prepared, a first resin layer composed of casting polypropylene (CPP) and having a thickness of 40 μm was formed on one surface of the metal layer, and a second resin layer formed of a nylon film and having a thickness of 10 μm was formed on the other surface of the metal layer, and in this case, an exterior material having a total thickness of 85 μm was manufactured by interposing an acid-modified polypropylene layer containing 6% by weight of acrylic acid in the copolymer between the first resin layer and the metal layer by 5 μm.

Further, in order to manufacture the electrode assembly, first, a positive electrode assembly and a negative electrode assembly were prepared. The positive electrode assembly was manufacturing by casting a lithium nickel cobalt manganese (NCM)-based positive electrode active material on both surfaces of the positive electrode current collector having a thickness of 20 μm and formed of an aluminum material so that a final thickness becomes 120 μm. Further, the negative electrode assembly was manufacturing by casting a graphite negative electrode active material on both surfaces of a foil-type negative electrode current collector formed of a copper material, having a thickness of 15 μm, and elongated by 20% so that a final thickness becomes 115 μm. In addition, a separator formed of a PET/PEN material and having a thickness of 20 μm was prepared and the positive electrode assembly, the separator, and the negative electrode assembly were alternately laminated to manufacture an electrode assembly including three positive electrode assemblies, six separators, and four negative electrode assemblies.

In addition, the first resin layer of the prepared exterior material was folded to be an inner surface, and then the electrode assembly was disposed in the exterior material so that the first resin layer of the folded exterior material comes into contact with the electrode assembly, and the electrode assembly was heat-pressed for 10 seconds at a temperature of 150° C. other than only a portion where an electrolyte solution may be injected. In addition, the battery was manufactured by injecting an electrolyte solution for a secondary battery including $LiPF_6$ as a lithium salt, a non-aqueous organic solvent composed of ethylene carbonate in an amount of 20% by volume, propylene carbonate in an amount of 5% by volume, propyl propionate (PP) in an amount of 50% by volume, and ethyl propionate (EP) in an amount of 25% by volume, and an additive composed of vinylene carbonate (VC) in an amount of 0.5% by weight, 1,3-propane sultone (PS) in an amount of 2% by weight, fluoroethylene carbonate (FEC) in an amount of 2.5% by weight, and adiponitrile (ADN) in an amount of 0.5% by weight based on the total weight of the electrolyte solution for a secondary battery into the portion, and then heat-pressing the portion of the electrode assembly where the electrolyte solution was injected at a temperature of 150° C. for 10 seconds. In addition, the flexible battery was manufactured by forming a wave pattern as shown in FIG. 3.

Examples 2 to 13

In the same manner as Example 1, a flexible battery was manufactured by changing a total content of the propyl propionate and the ethyl propionate, a volume ratio of the propyl propionate and the ethyl propionate, and a total content of the additive, and the like.

Example 14

In the same manner as Example 1, a flexible battery was manufactured using an electrolyte solution for a secondary battery including ethylene sulfate (ESA) in an amount of 0.5% by weight, fluoroethylene carbonate (FEC) in an amount of 2.5% by weight, and LiBOB in an amount of 0.5% by weight based on the total weight of the electrolyte solution for a secondary battery as an additive.

Examples 15 to 18

In the same manner as Example 14, a flexible battery was manufactured by changing a total content of the additive and the like.

Example 19

In the same manner as in Example 1, a flexible battery was manufactured using an electrolyte solution for a secondary battery including ethylene sulfate (ESA) in an amount of 0.5% by weight, fluoroethylene carbonate (FEC) in an amount of 2.5% by weight, and $LiPO_2F_2$ in an amount of 0.5% by weight based on the total weight of the electrolyte solution for a secondary battery as an additive.

Examples 20 to 23

In the same manner as Example 19, a flexible battery was manufactured by changing a total content of the additive and the like.

Comparative Example 1

In the same manner as Example 1, a flexible battery was manufactured without including an additive in an electrolyte solution.

<Experimental Example: Discharge Capacity Evaluation for Each Temperature>

On the basis of the flexible batteries manufactured in accordance with to Examples and Comparative Example, the flexible batteries were charged at a temperature of 25° C. and respectively stored in temperatures of −32° C., −32° C., −10° C., 0° C., 25° C., 45° C., and 60° C. for 24 hours, and then the discharge capacity of each of the batteries was charged.

TABLE 1

| | Classification | Example 1 | Example 2 | Example 3 | Example 4 | Example 5 | Example 6 |
|---|---|---|---|---|---|---|---|
| Non-aqueous organic solvent | Propyl propionate (PP, % by volume) | 50 | 36.67 | 43.33 | 56.67 | 63.33 | 68.18 |
| | Ethyl propionate (EP, % by volume) | 25 | 18.33 | 21.67 | 28.33 | 31.67 | 6.82 |
| | Total content of PP and EP in non-aqueous organic solvent (% by volume) | 75 | 55 | 65 | 85 | 95 | 75 |
| | PP, EP volume ratio | 1:0.5 | 1:0.5 | 1:0.5 | 1:0.5 | 1:0.5 | 1:0.1 |
| Additive | First ingredient Sort and content (wt %) | VC 0.5 | VC 0.5 | VC 0.5 | VC 0.5 | VC 0.5 | VC 0.5 |
| | Second ingredient Sort and content (wt %) | PS 2 | PS 2 | PS 2 | PS 2 | PS 2 | PS 2 |
| | Third ingredient Sort and content (wt %) | FEC 2.5 | FEC 2.5 | FEC 2.5 | FEC 2.5 | FEC 2.5 | FEC 2.5 |
| | Fourth ingredient Sort and content (wt %) | AND 0.5 | AND 0.5 | AND 0.5 | AND 0.5 | AND 0.5 | AND 0.5 |
| | Total content (wt %) | 5.5 | 5.5 | 5.5 | 5.5 | 5.5 | 5.5 |
| Discharge capacity (%) | −32° C. | 86.6 | 78.9 | 86.2 | 86.4 | 77.2 | 79.3 |
| | −20° C. | 97.6 | 91.2 | 96.4 | 97.1 | 90.5 | 91.5 |
| | −10° C. | 100 | 93.4 | 100 | 100 | 93.0 | 93.3 |
| | 0° C. | 100 | 99.2 | 100 | 100 | 98.8 | 99.7 |
| | 25° C. | 100 | 100 | 100 | 100 | 100 | 100 |
| | 45° C. | 98.5 | 97.2 | 97.9 | 97.7 | 96.6 | 96.8 |
| | 60° C. | 95.0 | 93.1 | 94.6 | 95.0 | 93.3 | 93.9 |

TABLE 2

| | Classification | Example 7 | Example 8 | Example 9 | Example 10 | Example 11 | Example 12 |
|---|---|---|---|---|---|---|---|
| Non-aqueous organic solvent | Propyl propionate (PP, % by volume) | 57.69 | 44.12 | 39.47 | 50 | 50 | 50 |
| | Ethyl propionate (EP, % by volume) | 17.31 | 30.88 | 35.53 | 25 | 25 | 25 |
| | Total content of PP and EP in non-aqueous organic solvent (% by volume) | 75 | 75 | 75 | 75 | 75 | 75 |
| | PP, EP volume ratio | 1:0.3 | 1:0.7 | 1:0.9 | 1:0.5 | 1:0.5 | 1:0.5 |
| Additive | First ingredient Sort and content (wt %) | VC 0.5 | VC 0.5 | VC 0.5 | VC 0.05 | VC 0.3 | VC 0.7 |
| | Second ingredient Sort and content (wt %) | PS 2 | PS 2 | PS 2 | PS 0.2 | PS 1.2 | PS 2.6 |
| | Third ingredient Sort and content (wt %) | FEC 2.5 | FEC 2.5 | FEC 2.5 | FEC 0.25 | FEC 1.5 | FEC 2.8 |
| | Fourth ingredient Sort and content (wt %) | ADN 0.5 | ADN 0.5 | ADN 0.5 | ADN 0.05 | ADN 0.3 | ADN 0.7 |
| | Total content (wt %) | 5.5 | 5.5 | 5.5 | 0.55 | 3.3 | 6.8 |
| Discharge capacity (%) | −32° C. | 86.3 | 86.6 | 78.2 | 65.2 | 85.7 | 87.2 |
| | −20° C. | 96.5 | 97.0 | 90.9 | 84.2 | 97.0 | 97.8 |
| | −10° C. | 100 | 100 | 93.1 | 90.4 | 100 | 100 |
| | 0° C. | 100 | 100 | 98.4 | 93.6 | 100 | 100 |
| | 25° C. | 100 | 100 | 100 | 100 | 100 | 100 |
| | 45° C. | 97.8 | 98.0 | 97.2 | 98.2 | 98.1 | 98.6 |
| | 60° C. | 94.7 | 94.2 | 94.0 | 95.6 | 94.3 | 94.8 |

TABLE 3

| | Classification | Example 13 | Example 14 | Example 15 | Example 16 | Example 17 | Example 18 |
|---|---|---|---|---|---|---|---|
| Non-aqueous organic solvent | Propyl propionate (PP, % by volume) | 50 | 50 | 50 | 50 | 50 | 50 |
| | Ethyl propionate (EP, % by volume) | 25 | 25 | 25 | 25 | 25 | 25 |
| | Total content of PP and EP in non-aqueous organic solvent (% by volume) | 75 | 75 | 75 | 75 | 75 | 75 |

TABLE 3-continued

| | Classification | | Example 13 | Example 14 | Example 15 | Example 16 | Example 17 | Example 18 |
|---|---|---|---|---|---|---|---|---|
| Additive | PP, EP volume ratio | | 1:0.5 | 1:0.5 | 1:0.5 | 1:0.5 | 1:0.5 | 1:0.5 |
| | First ingredient | Sort and content (wt %) | VC 1.2 | — | — | — | — | — |
| | Second ingredient | Sort and content (wt %) | PS 3.6 | ESA 0.5 | ESA 0.07 | ESA 0.3 | ESA 0.8 | ESA 1.5 |
| | Third ingredient | Sort and content (wt %) | FEC 4.0 | FEC 2.5 | FEC 0.36 | FEC 1.5 | FEC 3.5 | FEC 6 |
| | Fourth ingredient | Sort and content (wt %) | ADN 1.2 | LiBOB 0.5 | LiBOB 0.07 | LiBOB 0.3 | LiBOB 0.8 | LiBOB 1.5 |
| | Total content (wt %) | | 10 | 3.5 | 0.5 | 2.1 | 5.1 | 9 |
| Discharge capacity (%) | −32° C. | | 79.6 | 89.7 | 68.4 | 89.1 | 90.2 | 78.3 |
| | −20° C. | | 86.1 | 97.3 | 84.1 | 96.4 | 96.8 | 86.0 |
| | −10° C. | | 93.9 | 100 | 90.3 | 100 | 100 | 93.4 |
| | 0° C. | | 91.1 | 99 | 92.5 | 99.2 | 98.9 | 96.6 |
| | 25° C. | | 100 | 100 | 100 | 100 | 100 | 100 |
| | 45° C. | | 96.4 | 97.9 | 97.6 | 97.6 | 97.1 | 94.8 |
| | 60° C. | | 86.4 | 92.9 | 93.7 | 93.2 | 93.4 | 84.2 |

TABLE 4

| | Classification | | Example 19 | Example 20 | Example 21 | Example 22 | Example 23 | Co-Example 1 |
|---|---|---|---|---|---|---|---|---|
| Non-aqueous organic solvent | Propyl propionate (PP, % by volume) | | 50 | 50 | 50 | 50 | 50 | 50 |
| | Ethyl propionate (EP, % by volume) | | 25 | 25 | 25 | 25 | 25 | 25 |
| | Total content of PP and EP in non-aqueous organic solvent (% by volume) | | 75 | 75 | 75 | 75 | 75 | 75 |
| Additive | PP, EP volume ratio | | 1:0.5 | 1:0.5 | 1:0.5 | 1:0.5 | 1:0.5 | 1:0.5 |
| | First ingredient | Sort and content (wt %) | — | — | — | — | — | — |
| | Second ingredient | Sort and content (wt %) | ESA 0.5 | ESA 0.07 | ESA 0.3 | ESA 0.8 | ESA 1.5 | — |
| | Third ingredient | Sort and content (wt %) | FEC 2.5 | FEC 0.36 | FEC 1.5 | FEC 3.5 | FEC 6 | — |
| | Fourth ingredient | Sort and content (wt %) | $LiPO_2F_2$ 0.5 | $LiPO_2F_2$ 0.07 | $LiPO_2F_2$ 0.3 | $LiPO_2F_2$ 0.8 | $LiPO_2F_2$ 1.5 | — |
| | Total content (wt %) | | 3.5 | 0.5 | 2.1 | 5.1 | 9 | — |
| Discharge capacity (%) | −32° C. | | 91.8 | 70.6 | 91.5 | 91.7 | 79.4 | 54.7 |
| | −20° C. | | 98.7 | 85.5 | 98.2 | 98.0 | 86.6 | 73.6 |
| | −10° C. | | 100 | 90.1 | 100 | 100 | 93.5 | 84.5 |
| | 0° C. | | 100 | 93.3 | 100 | 100 | 91.0 | 92.2 |
| | 25° C. | | 100 | 100 | 100 | 100 | 100 | 100 |
| | 45° C. | | 97.3 | 96.7 | 97.1 | 96.3 | 94.2 | 99.3 |
| | 60° C. | | 91.5 | 92.2 | 90.6 | 91.2 | 84.3 | 96.2 |

As shown in the Tables 1 to 4, it may be confirmed that Examples 1, 3, 4, 7, 8, 11, 12, 15, 16, 19 and 20 which satisfy all the total content of the propyl propionate and the ethyl propionate according to the present invention, the volume ratio of the propyl propionate and the ethyl propionate, and the type and total content of the additive, and the like exhibit excellent discharge performance in all of various temperature ranges including extremely high and low temperatures in comparison with Examples 2, 5, 6, 9, 10, 13, 14, 17, 18, 21 in which at least one of the above is omitted and Comparative Example 1.

Although one embodiment of the present invention is described above, the spirit of the present invention is not limited to the embodiment shown in the description, and although those skilled in the art may provide other embodiments through the addition, change, or removal of the components within the scope of the same spirit of the present invention, such embodiments are also included in the scope of the spirit of the present invention.

The invention claimed is:

1. An electrolyte solution for a secondary battery comprising:
   a non-aqueous organic solvent including propyl propionate (PP), and 20 to 80 parts by volume of ethyl propionate (EP), 15 to 65 parts b volume of ethylene carbonate (EC), and 3 to 17 parts by volume of propylene carbonate (PC) based on 100 parts by volume of the propyl propionate (PP);
   a lithium salt; and
   an additive,
   wherein the lithium salt is included in a concentration of 0.6 to 1.6 M, and
   wherein the additive includes vinylene carbonate (VC) in an amount of 0.3 to 0.8% by weight, 1,3-propane sultone (PS) in an amount of 1.2 to 2.8% by weight, fluoroethylene carbonate (FEC) in an amount of 1.5 to 3.5% by weight, and adiponitrile (ADN) in an amount of 0.3 to 0.8% by weight based on a total weight of the electrolyte solution for the secondary battery.

2. The electrolyte solution of claim 1, wherein the propyl propionate and the ethyl propionate are included in an amount of 60 to 90% by volume based on a total volume of the non-aqueous organic solvent.

3. The electrolyte solution of claim 1, wherein the non-aqueous organic solvent includes the propyl propionate and the ethyl propionate in a volume ratio of 1:02 to 0.8.

4. A battery for a secondary battery including the electrolyte solution according to claim 1.

5. A flexible battery comprising:
 an electrode assembly;
 the electrolyte solution according to claim 1; and
 an exterior material configured to encapsulate the electrode assembly with the electrolyte solution.

6. The flexible battery of claim 5, wherein a discharge capacity measured by the following measuring method is 80% or more:

[Measuring Method]

A flexible battery is charged at 25° C. and stored at −32° C. for 24 hours, and then the discharge capacity is measured.

* * * * *